(12) United States Patent
Hoshaku

(10) Patent No.: US 7,814,252 B2
(45) Date of Patent: Oct. 12, 2010

(54) ASYMMETRIC MULTIPROCESSOR

(75) Inventor: Masahiro Hoshaku, Kanagawa (JP)

(73) Assignee: Panasonic Corporation, Osaka (JP)

( * ) Notice: Subject to any disclaimer, the term of this patent is extended or adjusted under 35 U.S.C. 154(b) by 551 days.

(21) Appl. No.: 11/758,308

(22) Filed: Jun. 5, 2007

(65) Prior Publication Data
US 2007/0283128 A1 Dec. 6, 2007

(30) Foreign Application Priority Data
Jun. 6, 2006 (JP) .............................. 2006-157826

(51) Int. Cl.
*G06F 13/14* (2006.01)

(52) U.S. Cl. ..................... 710/240; 710/260; 713/300; 713/600; 712/1

(58) Field of Classification Search ......... 710/240–244, 710/260–269; 713/600, 300–340; 712/1
See application file for complete search history.

(56) References Cited

U.S. PATENT DOCUMENTS

| | | | |
|---|---|---|---|
| 5,301,324 A | 4/1994 | Dewey et al. | |
| 5,649,184 A | 7/1997 | Hayashi et al. | |
| 6,058,414 A * | 5/2000 | Manikundalam et al. | .... 718/104 |
| 6,920,572 B2 * | 7/2005 | Nguyen et al. | .............. 713/322 |
| 6,925,641 B1 * | 8/2005 | Elabd | .......................... 718/101 |
| 2004/0187126 A1 | 9/2004 | Yoshimura | |
| 2004/0224790 A1 * | 11/2004 | Lu | .............................. 473/345 |
| 2005/0198422 A1 * | 9/2005 | Galbraith et al. | ............ 710/260 |

FOREIGN PATENT DOCUMENTS

JP 2004 252900 9/2004

OTHER PUBLICATIONS

English language Abstract of JP 2004-252900.

* cited by examiner

*Primary Examiner*—Mark Rinehart
*Assistant Examiner*—Kim T Huynh
(74) *Attorney, Agent, or Firm*—Greenblum & Bernstein, P.L.C.

(57) ABSTRACT

An asymmetric multiprocessor capable of increasing a degree of freedom of distributed processing, minimizing a processing load on each processor (CPU), and achieving a large reduction in power consumption by reducing an operating frequency or lowering the power supply voltage. An asymmetric multiprocessor includes a hardware resource mediator that mediates request signals requesting permission to use arbitrary hardware accelerators from CPU cores. A signal processing content selector selects signal processing content of a dynamically reconfigurable signal processor that is connected as a slave A clock skew mediator arbitrarily shifts a clock phase relationship among groups, while clock delay generators delay a clock signal based on a clock skew selection enable signal.

15 Claims, 6 Drawing Sheets

ASYMMETRIC MULTIPROCESSOR

CROSS REFERENCE TO RELATED APPLICATIONS

The disclosure of Japanese Patent Application No. 2006-157826 filed on Jun. 6, 2006 including the specification, drawings and abstract is incorporated herein by reference in its entirety.

BACKGROUND OF THE INVENTION

1. Field of the Invention

The present invention relates to an asymmetric multiprocessor for controlling a dedicated signal processing hardware, a DSP (Digital Signal Processor) and a reconfigurable processor in a microprocessor and a media processor.

2. Description of the Related Art

Processors provided to mobile telephones of the recent years provided with Internet access function are configured with high-performance media processor engines (combinations of a DSP or a CPU and a hardware accelerator) that are capable of performing Java (registered trademark) program processing, web connection control, audio processing or graphics processing, image processing such as MPEG (Moving Picture Experts Group), digital TV, games, and the like in addition to speech processing and baseband processing. For such multimedia processors, a distributed processing multiprocessor is expected as a means of enhancing the efficiency of software development, reducing the surface area to be implemented on LSI (Large Scale Integration) and reducing operating currents.

In a conventional asymmetric multiprocessor, a plurality of processors are provided, and the processors are different from each other in any or all of performance (such as an operating frequency), command set and architecture (such as a bit width or a memory size, a cache size and the number of stages of pipelines).

There are also cases, for example, where the processing shares (role shares) of the CPUs are decided in advance in an asymmetric multiprocessor provided with a plurality of CPUs. In this case, the CPUs are configured to make a slave connection with a dedicated signal processing hardware circuit (hardware accelerator) or a DSP according to the role shares (see Japanese Patent Application Laid-open No. 2004-252900, for example).

FIG. 1 shows a configuration of the conventional asymmetric multiprocessor.

In FIG. 1, asymmetric multiprocessor system 10 is configured with CPU cores 11a through 11c (CPU #1 through #3), cache memory (hereinafter referred to as caches) 12a through 12c ($1 through $3), ROM 13, RAM 14, CPU core 11a (CPU #1) slave/hardware (hereinafter abbreviated as HW as appropriate) accelerator sections 15a through 15c (HW #1a through #1c), CPU core 11b (CPU #2) slave/hardware accelerator sections 16a and 16b (HW #2a and #2b), CPU core 11c (CPU #3) slave/hardware accelerator sections 17a and 17b (HW #3a and #3b), and other components. CPU cores 11a through 11c (CPU #1 through #3) are each connected to ROM 13 and RAM 14 via common bus 18 and cache memory 12a through 12c ($1 through $3). CPU core 11a (CPU #1) and slave/hardware accelerator sections 15a through 15c (HW #1a through #1c) are connected by local bus 19; CPU core 11b (CPU #2) and slave/hardware accelerator sections 16a and 16b (HW #2a and #2b) are connected by local bus 20; and CPU core 11c (CPU #3) and slave/hardware accelerator sections 17a and 17b (HW #3a and #3b) are connected by local bus 21.

Portions of the above-described slave/hardware accelerator sections 15a through 15c, 16a, 16b, 17a and 17b are configured, for example, with DSPs and functional blocks such as video signal processing blocks, audio signal processing blocks and control signal processing blocks.

According to the technique of dividing the processing executed on a software program among the above-described different processor architectures, it is possible to obtain an effect of suppressing hardware resource compared to the case where the processing is performed in a single processor, and an effect of reducing power consumption by reducing clock frequencies of the processors as a result of dividing the processing shares.

However, in such a conventional asymmetric multiprocessor, a plurality of unit jobs for which the amount of jobs is predictable are divided among a plurality of processors for each unit job, and therefore the effect of reducing power consumption is often small depending on the prediction algorithm or the prediction system.

In the asymmetric multiprocessor disclosed in Japanese Patent Application Laid-open No. 2004-252900, the processing contents of the CPUs are often fixed to some extent when the overall configuration (processor architecture design) of the multiprocessor is determined. Along with this, like the asymmetric multiprocessor shown in FIG. 1, slave/hardware accelerator sections 15a through 15c, 16a, 16b, 17a and 17b for supporting acceleration of the processing of the CPUs are made a dedicated connection with CPU cores 11a through 11c via local buses 19 through 21, respectively. Therefore, even when the content of the processed program changes and the processing amount increases, the processing amount cannot be readily shared (program task sharing) among the plurality of CPU cores 11a through 11c, and therefore there is only a small degree of freedom in the load distribution.

In both of the former asymmetric multiprocessor and the latter asymmetric processor disclosed in Japanese Patent Application Laid-open No. 2004-252900, and, even in the asymmetric multiprocessor having both elements, a plurality of CPUs, hardware accelerators, DSPs, or the like operate simultaneously, and therefore, there is a problem of an increase in power consumption within the LSI.

Further, there are methods for achieving low power consumption by varying (or reducing) the operating frequency by performing distributed processing, and varying (or reducing) the operating frequency and the power supply voltage.

However, the design of a clock tree that assumes distributed processing becomes complicated, and the IR drop (voltage drop or voltage fluctuation) of the power supply voltage in the case of operation at the maximum operating frequency, or the dynamic power supply noise increases, and malfunction of the LSI becomes a problem.

SUMMARY OF THE INVENTION

It is therefore an object of the present invention to provide an asymmetric multiprocessor capable of increasing the degree of freedom of distributed processing, minimizing the processing load on each processor (CPU), and achieving large reduction in power consumption by reducing the operating frequency or lowering the power supply voltage.

According to an aspect of the invention, an asymmetric multiprocessor is provided where a plurality of processor cores and a plurality of hardware accelerators are connected via a bus, the asymmetric multiprocessor including a hardware resource mediation section that mediates request signals requesting permission to use arbitrary hardware accelerators from the processor cores, wherein the processor core that is subjected to mediation of the request signal by the hardware resource mediation section uses an arbitrary hardware accelerator.

DETAILED DESCRIPTION OF THE PREFERRED EMBODIMENTS

Embodiments of the present invention will be described in detail hereinafter with reference to the accompanying drawings.

Embodiment 1

Figure 2:
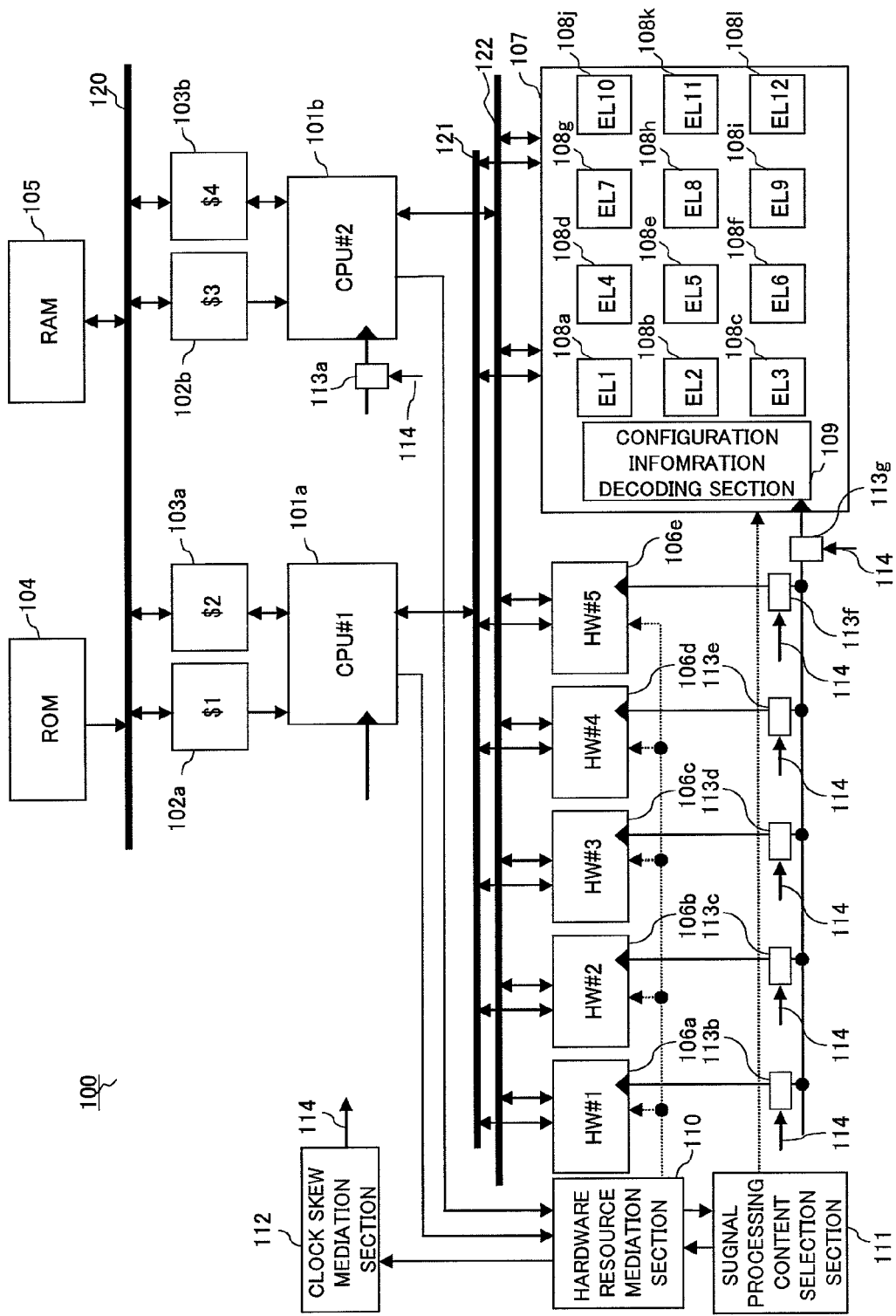
FIG. 2 is a block diagram showing a configuration of the asymmetric multiprocessor according to Embodiment 1 of the present invention.

FIG. 2 is a block diagram showing the configuration of the asymmetric multiprocessor according to Embodiment 1 of the present invention. This embodiment is an example where the present invention is applied to an asymmetric multiprocessor provided with a first processor core (CPU core) or a second processor core (CPU core) as a multi-core processor provided with two or more processors.

In FIG. 2, asymmetric multiprocessor 100 is provided with first CPU core 101a (CPU #1), second CPU core 101b (CPU #2), first command cache 102a ($1), first data cache 103a ($2), second command cache 102b ($3), second data cache 103b ($4), ROM 104, RAM 105, a plurality of hardware accelerator sections 106a through 106e (HW #1 through #5), dynamically reconfigurable signal processor section 107 which can be dynamically reconfigured, hardware resource mediation section 110 that mediates a request signal from CPU cores 101a and 101b that requests permission to use an arbitrary hardware accelerator, signal processing content selection section 111 that selects signal processing content of dynamically reconfigurable signal processor section 107 connected as a slave, clock skew mediation section 112 that performs control for arbitrarily shifting a clock phase relationship among groups, and clock delay generation sections 113a through 113g that delay the clock signal based on clock skew selection enable signal 114. Dynamically reconfigurable signal processor section 107 is configured with a plurality of processors/elements 108a through 108l (EL 1 through EL 12) and configuration information decoding section 109.

First CPU core 101a (CPU #1) is mutually connected to ROM 104 and RAM 105 via first command cache 102a ($1), first data cache 103a ($2) and bus 120, and second CPU core 101b (CPU #2) is mutually connected to ROM 104 and RAM 105 via second command cache 102b ($3), second data cache 103b ($4) and bus 120.

First CPU core 101a (CPU #1) is connected via bus 121 to hardware accelerator sections 106a through 106e (HW #1 through #5) and dynamically reconfigurable signal processor section 107, and second CPU core 101b (CPU #2) is connected via bus 122 to hardware accelerator sections 106a through 106e (HW #1 through #5) and dynamically reconfigurable signal processor section 107.

First CPU core 101a (CPU #1) is a CPU for communication control, for example, and second CPU core 101b (CPU #2) is a CPU for media processing control, for example. First CPU core 101a (CPU #1) and second CPU core 101b (CPU #2) are asymmetric multiprocessors configured with a plurality of CPUs which are different in any or all of capacities of command caches 102a and 102b, capacities of data caches 103a and 103b, processor performance such as an operating frequency, a command set and an architecture including a bit width, a memory size, a cache size and the number of stages of pipelines. FIG. 2 shows a multi-core processor provided with two processors of first CPU core 101a (CPU #1) and second CPU core 101b (CPU #2), but it is also possible to use a multiprocessor having another processor cores.

ROM 104 is a command ROM, and RAM 105 is a data RAM.

Figure 1:
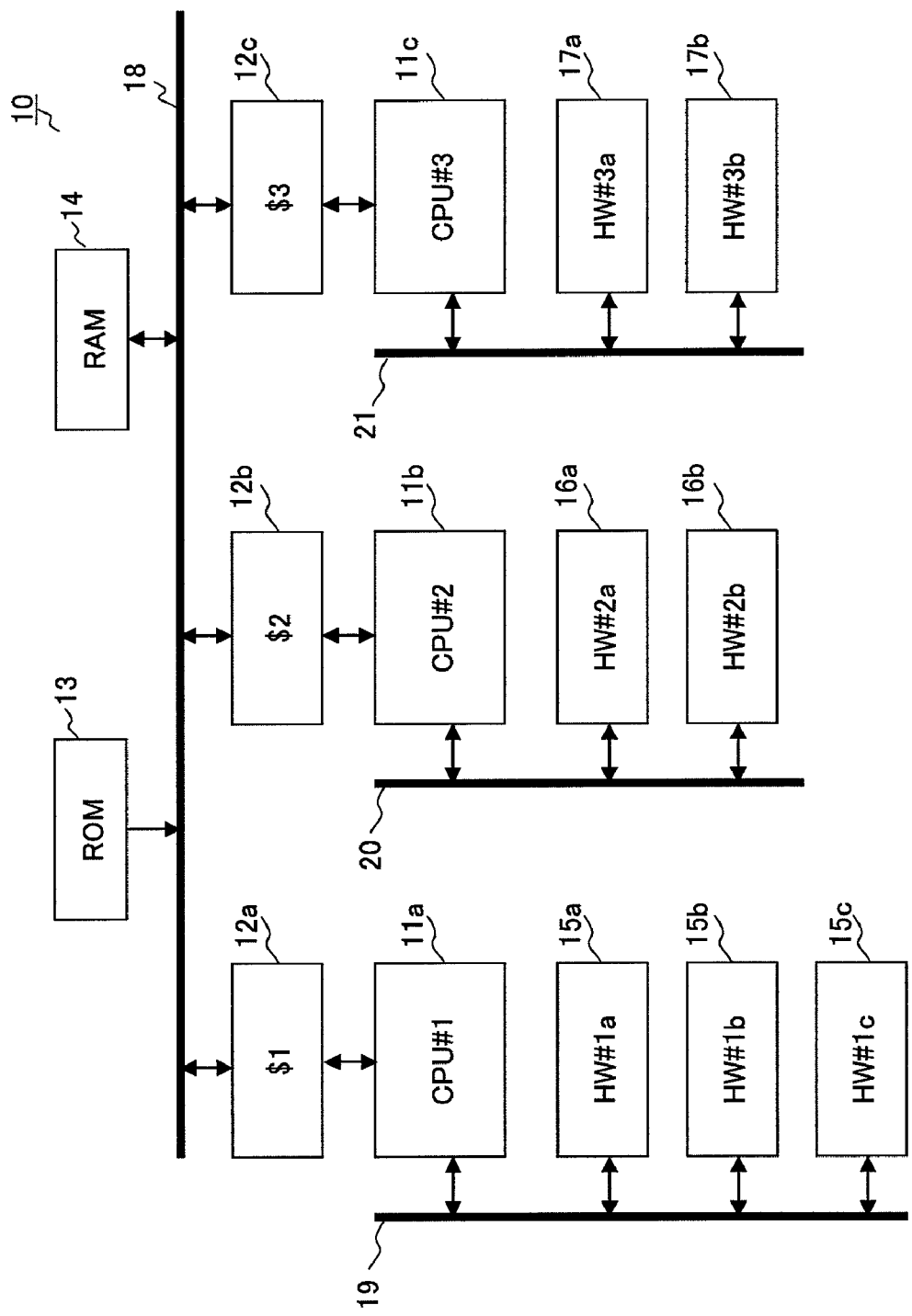
FIG. 1 shows a configuration of the conventional asymmetric multiprocessor.

Hardware accelerator sections 106a through 106e (HW #1 through #5) are, for example, encryption engines, equivalent processing engines, channel codec engines, 3D graphics engines or MPEG4 encoder engines. In this embodiment, first CPU core 101a (CPU #1) and second CPU core 101b (CPU #2) each share the hardware accelerator sections 106a through 106e (HW #1 through #5). In the conventional example shown in FIG. 1, first CPU core 101a (CPU #1) and second CPU core 101b (CPU #2) are not configured to share hardware accelerator sections 106a through 106e (HW #1 through #5) as in this embodiment, and hardware accelerator sections 15a through 15c (HW #1a through #1c) shown in FIG. 1 are connected, for example, as slaves to CPU #1 via local bus 19, and hardware accelerators HW #16a and 16b are connected as slaves to CPU #2 via local bus 20.

With reference to FIG. 2, hardware resource mediation section 110, signal processing content selection section 111, clock skew mediation section 112 and clock delay generation sections 113a through 113g are provided from the following point of view.

Hardware resource mediation section 110 mediates request signals from the CPUs that request permission to use arbitrary hardware accelerators. By mediating the request signals, arbitrary processor cores can use arbitrary hardware accelerators, so that it is possible to achieve load distribution of the processor.

Signal processing content selection section 111 selects signal processing content of dynamically reconfigurable signal processor section 107 connected as a slave, and is configured with a RAM and a selection circuit (neither is shown in the drawing). Information such as the order of connecting processors/elements is stored in advance in the RAM as configuration information. The RAM updates the stored configuration information, and it is thereby possible to add and modify necessary hardware engines.

Clock skew mediation section 112 performs control for arbitrarily shifting the clock phase relationship among a first signal processing group configured with first CPU core 101a (CPU #1) and a hardware accelerator that requests execution of signal processing from first CPU core 101a (CPU #1), a second signal processing group configured with second CPU core 101b (CPU #2) and a hardware accelerator that requests execution of signal processing from second CPU core 101b (CPU #2) and a third signal processing group and subsequent signal processing groups (not shown in the drawing) configured with a third processor core and subsequent processor cores and hardware accelerators that request execution of signal processing from the third and subsequent processor cores.

Clock delay generation sections 113a through 113g have a plurality of delay buffers and selectors (none of which is shown in the drawing) for selecting the delay buffers, and are provided in the clock input sections of the above-described groups. Clock delay generation sections 113a through 113g delay the clock signal based on clock skew selection enable signal 114 from clock skew mediation section 112, and arbitrarily shifts the clock phase among groups.

Figure 3:
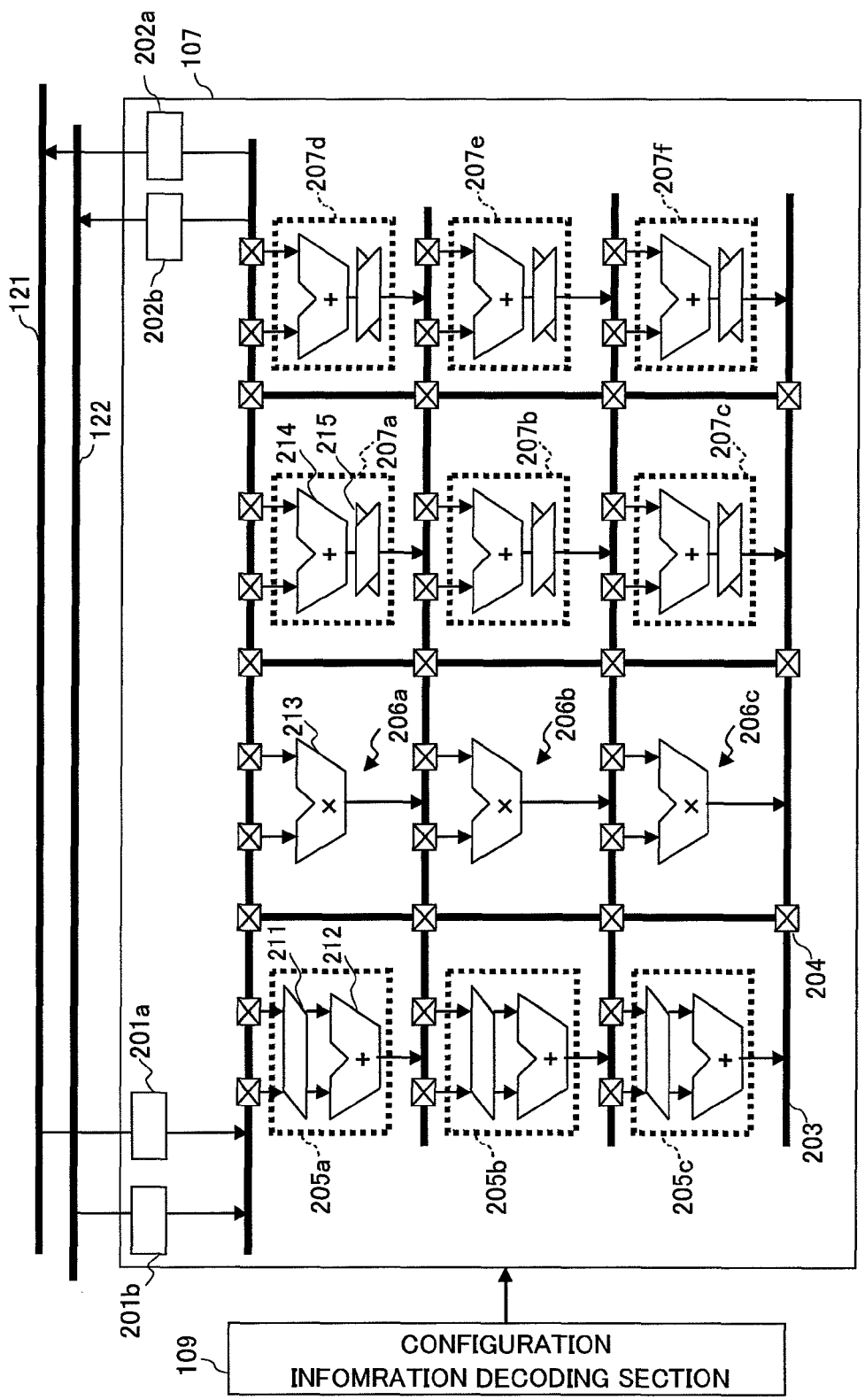
FIG. 3 shows an example of the configuration of the dynamically reconfigurable signal processor section of the asymmetric multiprocessor according to the above-described embodiment.

FIG. 3 shows an example of the configuration of dynamically reconfigurable signal processor section 107.

Dynamically reconfigurable signal processor section 107 can be dynamically reconfigured and configured with a plurality of processors/elements 108a through 108l (EL1 through EL12) and configuration information decoding section 109 as shown in FIG. 2. An example of the configuration of dynamically reconfigurable signal processor section 107 is shown in FIG. 3, and dynamically reconfigurable signal processor section 107 is configured with: input buffer 201a that receives input data from bus 121 (external bus as viewed from dynamically reconfigurable signal processor section 107); input buffer 201b that receives input data from bus 122; output buffer 202a that outputs data from dynamically reconfigurable signal processor section 107 to bus 121; output buffer 202b that outputs data from dynamically reconfigurable signal processor section 107 to bus 122; internal bus 203 arranged in a matrix; bus selector switches 204 provided at each node and between nodes of internal bus 203 arranged in a matrix; processors/elements 205a through 205c (processors/elements A); processors/elements 206a through 206c (processors/elements B); processors/elements 207a through 207f (processors/elements C); and configuration information decoding section 109.

Processors/elements 205a through 205c, 206a through 206c, and 207a through 207f are configured with several types of processors/elements (EL). For example, shift computing units 211 and ALUs 212 are provided for processors/elements 205a through 205c (processors/elements A), multipliers 213 are provided for processors/elements 206a through 206c (processors/elements B), and ALUs 214 and barrel shifters 215 are provided for processors/elements 207a through 207f (processors/elements C).

The operation of asymmetric multiprocessor 100 configured as described above will be described hereinafter.

(Mediation Operation of Hardware Resource Mediation Section 110)

The selection operation of hardware accelerator sections 106a through 106e (HW #1 through #5) will first be described.

Hardware accelerator sections 106a through 106e (HW #1 through #5) perform selection operation in such a manner that hardware resource mediation section 110 mediates request signals from CPU cores 101a and 101b that request permission to use arbitrary hardware accelerators.

When first CPU core 101a (hereinafter referred to as CPU #1) specifies the address map of hardware accelerator section 106a (hereinafter referred to as HW #1) in order to encrypt data, a bus connection as a slave to CPU #1 is permitted when second CPU core 101b (hereinafter referred to as CPU #2) does not request HW #1. When the requests of CPU #1 and CPU #2 conflict (compete), and in the case of simultaneous requests, mediations (1) and (2) below are performed That is, (1) a connection to the hardware accelerator is permitted for high-priority processing, and the other CPU to which a connection is not permitted is stalled. Alternatively, (2) mediation is performed so as to share the processing by using a reconfigurable processor when the hardware accelerator can be implemented by dynamically reconfigurable signal processor section 107.

Hardware resource mediation section 110 is provided in advance with a table model or the like for assigning priority according to the processing speed of the CPU that issues the request or the real-time characteristics (processing content) of the processing shared by the CPU. The request signal from the CPU has a priority bit, and by issuing this signal from the CPU, the hardware accelerator is preferentially connected to the CPU that issues the priority bit. Software of the CPU controls whether to issue a priority bit. Further, errors are processed by a compiler or the like, and the software program where priority bits are issued at the same time from a plurality of CPUs can be prevented by requesting revision of the software coding.

When an interrupt request is issued for the hardware accelerator already used by one CPU from another CPU, the distribution processing by asymmetric multiprocessor 100 is performed through the mediation described in (1) and (2) above in the same way as during the above-described conflict, or (3) by stopping the previous signal processing, and, after saving the interim result, interrupting the request of the CPU that makes a request later, or (4) by permitting the processing of the CPU that makes a request later without saving the interim result.

Furthermore, when hardware resource mediation section 110 selects dynamically reconfigurable signal processor section 107 which can be dynamically reconfigured, by monitoring the presence of the necessary hardware engine in advance from table data stored in signal processing content selection section 111 for selecting the signal processing content of dynamically reconfigurable signal processor section 107 connected as a slave. When the hardware engine stored in the table data matches the necessary hardware engine, hardware resource mediation section 110 transmits an HW selection enable signal to signal processing content selection section 111.

From the data stored in the RAM incorporated in signal processing content selection section 111, the reconfiguration information of the selected hardware engine is transmitted by this HW selection enable signal to configuration information decoding section 109 of dynamically reconfigurable signal processor section 107 which can be dynamically reconfigured. Configuration information decoding section 109 reconfigures the connection relationship of processors/elements 108a through 108l and dynamically constructs the necessary hardware accelerator. Hardware resource mediation section 110 appropriately connects this reconfigurable processor as a slave of the CPU and copes with the cases where circuit resources are inadequate in an internal hardware accelerator.

In this arrangement, signal processing content selection section 111 that selects the signal processing content of dynamically reconfigurable signal processor section 107 connected as a slave is configured with a RAM and a selection circuit, and stores in advance information such as the order in which processors/elements are connected as several types of configuration information in the RAM, and, by updating the configuration information stored in the RAM, it is possible to add and modify necessary hardware engines to some extent.

For example, the configuration information stored in signal processing content selection section 111 is stored in ROM 104 and automatically downloaded when this asymmetric multiprocessor 100 is started. In order to add to or modify the configuration of the configuring circuit, by updating RAM information incorporated in signal processing content selection section 111 via RAM 105, addition of the hardware accelerator that accompanies performance upgrades or changes in signal processing specifications can be facilitated to some extent.

The operation of dynamically reconfigurable signal processor section 107 which can be dynamically reconfigured will next be described with reference to FIG. 3.

Dynamically reconfigurable signal processor section 107 is provided with: several types of processors/elements—here, processors/elements 205a through 205c (processors/elements A) configured with shift computing units 211 and ALUs 212—; processors/elements 206a through 206c (processors/elements B) configured with computing units 213, and processors/elements 207a through 207f (processors/elements C) configured with ALUs 214 and barrel shifters 215. Configuration information decoding section 109, which is a reconfiguration information decoding section, decodes externally inputted configuration information. As a result of this decoding, bus selector switches 204 are switched; the necessary processor/element is selected from processors/elements 205a through 205c (processors/elements A), processors/elements 206a through 206c (processors/elements B), and processors/elements 207a through 207f (processors/elements C), and is reconnected in the order of the signal processing via internal bus 203 switched by bus selector switches 204, and a data bus is formed.

By the control signal from signal processing content selection section 111, the necessary CPU is appropriately connected as a slave to the data inputted to dynamically reconfigurable signal processor section 107 or to the data outputted from dynamically reconfigurable signal processor section 107 via external buses 121 and 122 so as to enable to be used as a hardware accelerator. The following functions are made possible by the mediation operation of hardware resource mediation section 110 described above. Asymmetric multiprocessor 100 is provided with a plurality of processors (CPUs) that are optimized for characteristics of signal processing such as audio processing, image processing and baseband processing. When CPU resources are idle in one CPU, for example, first CPU core 101a (CPU #1), or the CPU load is low, some of the processing tasks of another CPU, for example, second CPU core 101b (CPU #2) are divided among the CPUs, and the processing is distributed so that CPU #1 and CPU #2 can both process at a lower operating frequency with respect to the maximum processing capability. The operating power can also be reduced by lowering the operating voltage at this time, and each CPU can also freely select a provided hardware accelerator.

In the case of video telephone processing, image codec and voice codec must be performed simultaneously in a media processor, for example, in which an MPEG engine and an audio codec engine are connected as slaves to CPU #1, and a 3D graphics engine is connected as a slave to CPU #2. In this case, using a time period during which the processing amount is low, the audio codec engine is connected as a slave to the second CPU, and the processing is distributed so that images are processed by CPU #1 and the image engine, and audio signals are processed by CPU #2 and the audio engine.

In the case of playing game, the processing load can be optimized by using CPU #2 and the graphics engine to process 3D graphics, and using the first CPU and the audio engine to process sound effects.

(Mediation Operation of Clock Skew Mediation Section 112)

When the operating frequencies of CPU #1 and CPU #2 are the same, for example, hardware resource mediation section 110 in FIG. 2 relays the information of the hardware accelerator selected as a slave of CPU #2 to clock skew mediation section 112. Clock skew mediation section 112 thereby performs control so as to arbitrarily shift the clock phase relationship among the groups configured with the hardware accelerators that request execution of signal processing. Clock skew mediation section 112 arbitrarily shifts the clock phase among groups by using clock delay generation sections 113a through 113g provided to the clock input sections of the groups.

Specifically, clock skew selection enable signal 114 is transmitted to clock delay generation sections 113a through 113g of the hardware accelerators connected as slaves to CPU #2 so as to supply a clock obtained by shifting the phases of the clock supplied to CPU #2 and the clock supplied to the hardware accelerator connected as a slave to CPU #2 by one-half cycle, for example, with respect to the clock of CPU #1. The clock edges of the processing in CPU #1 and the processing in CPU #2 thereby alternately occur, and the IR drop within the LSI is reduced. As a result, the reduction of the skew of the signals or clock signals makes it possible to suppress the increasing DC current and reduce current consumption, and prevent malfunction by suppressing the peak current. In this case, the peak current can be reduced by the same control even when CPU #1 and CPU #2 are operating at different frequencies. In other words, CPU #1 and CPU #2 are based on a synchronous design, but a useful skew control can be performed according to the operating frequency of each processor. This enables operation where the clock skew is intentionally shifted with respect to the circuits of a given portion.

Figure 4:
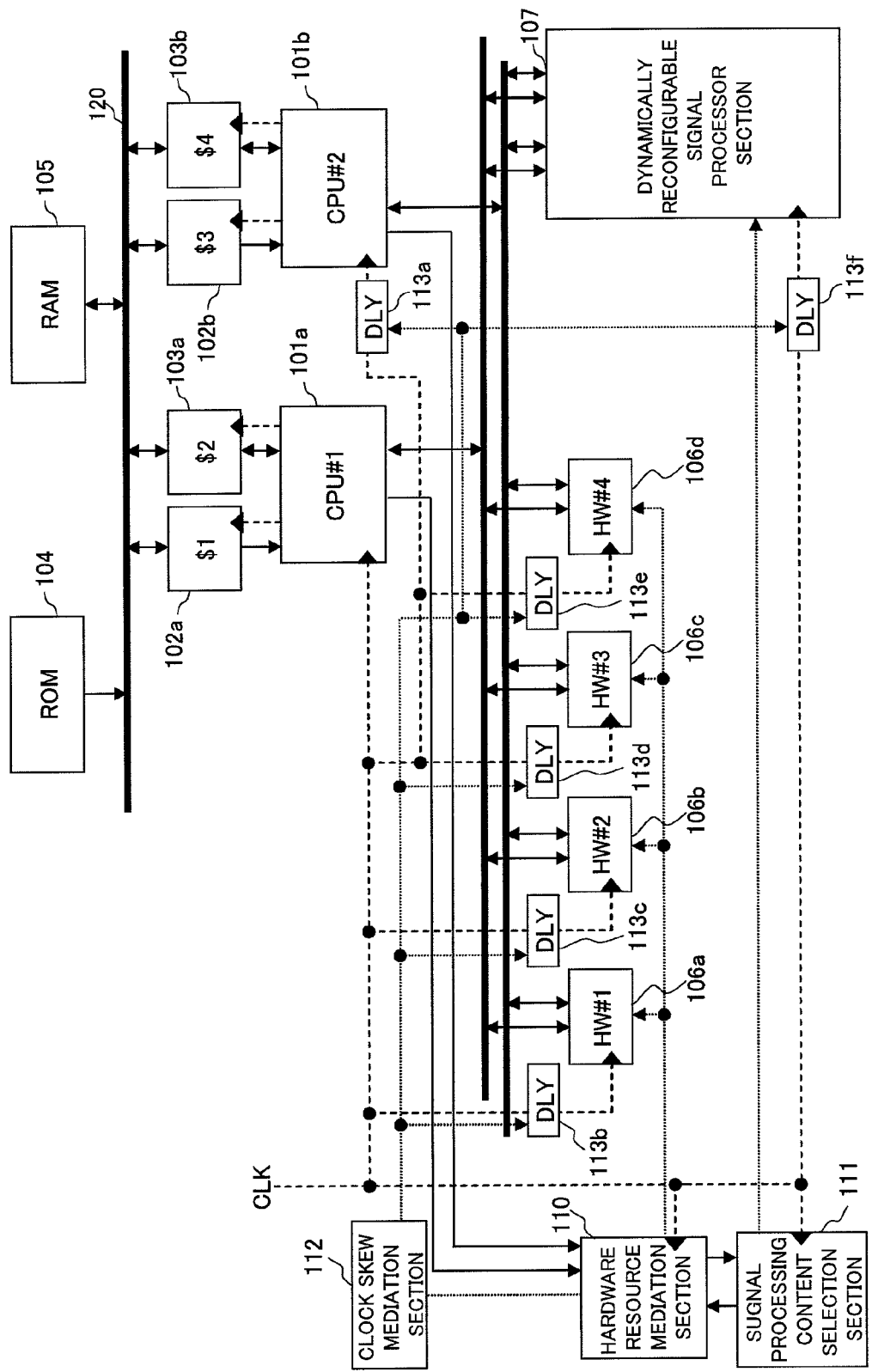
FIG. 4 illustrates the clock skew control mechanism of the asymmetric multiprocessor according to the above-described embodiment.

FIG. 4 shows the clock skew control mechanism. An example is shown where an arbitrary clock skew is generated between CPU #1 and the slave hardware thereof, and between CPU #2 and the slave hardware thereof.

For CPU #2 and a hardware accelerator for which a request signal is issued from CPU #2 to hardware resource mediation section 110, clock skew mediation section 112 sets arbitrary delay information for the hardware and clock delay generation sections 113a, 113b, 113c, 113d and 113e provided to the clock input section of CPU #2. A plurality of delay buffers and selectors (none of which is shown in the drawing) that select the delay buffers are provided within clock delay generation sections 113a, 113b, 113c, 113d and 113e, and the selectors can be used to perform fine adjustment by selecting the delay buffers. In FIG. 4, clock delay generation section 113e in the final stage inverts the clock using an inverter, and CPU #2 and the slave hardware of CPU #2 operate using the inverted clock.

When processing in CPU #2 is completed and communication with CPU #1 is performed via a bus, the CPU stall is minimized by latching and absorbing a half-cycle shift using a latch circuit (not shown). Through the mediation operation of clock skew mediation section 112 described above, control is performed so that the phase of the operating clock shifts with respect to the operating clocks of CPU #1 and the hardware accelerator, DSP or dynamically reconfigurable processor connected thereto as a slave or with respect to the operating clocks of the congested CPU #2 and the hardware accelerator, DSP or dynamically reconfigurable processor connected thereto as a slave.

The IR drop of the power supply voltage within the LSI can thereby be suppressed, and the operating power can be reduced by preventing the skew of internal signals from increasing and by suppressing DC through currents. The peak current can also be reduced by avoiding clock overlap. Furthermore, the peak-current reducing effects eliminate the need to require an excessive allowable current capability for external components (power supply ICs), and also make it possible to reduce the component cost of power supply ICs.

According to this embodiment as described in detail above, asymmetric multiprocessor 100 is configured with: hardware resource mediation section 110 that mediates a request signal from CPU cores 101a and 101b that requests permission to use an arbitrary hardware accelerator; and signal processing content selection section 111 that selects the signal processing content of dynamically reconfigurable signal processor section 107 connected as a slave, so that arbitrary processor core can use arbitrary hardware accelerator in a configuration where the CPUs share the hardware accelerators, DSPs or other processors that are connected as slaves. That is, the conventional asymmetric multiprocessor has a configuration where the hardware accelerators connected as slaves to the CPUs cannot be shared among the CPUs, and therefore there is a problem that the constraints of the hardware accelerators reduce the degree of freedom of distributed processing, and the reduction effects in power consumption cannot be adequately obtained even when software program tasks are allocated according to the amount of work of the CPUs. By contrast with this, the CPUs can share the processor such as hardware accelerator and DSP connected as a slave thereto in asymmetric multiprocessor 100 of this embodiment, and can efficiently perform distributed processing. By this means, it is possible to readily achieve a lower operating frequency or power supply voltage in the CPUs, hardware accelerators or DSPs, and efficiently reduce power consumption.

Asymmetric multiprocessor 100 of this embodiment also has clock skew mediation section 112 that performs control for arbitrarily shifting the clock phase relationship among groups, and clock delay generation sections 113a through 113g that delay the clock signal based on clock skew selection enable signal 114. Therefore, asymmetric multiprocessor 100 has a configuration for adjusting the phase of the CPU clock signals, and thereby IR drops and reductions of the peak current can be minimized. By this means, it is possible to prevent malfunction of the processor and further reduce power consumption. That is, the plurality of processors provided in the conventional asymmetric multiprocessor operate simultaneously, and therefore malfunctions and increases in power consumption are caused by increased peak current and IR drops of the power supply within the LSI due to overlapping of clock edges. However, in this embodiment, it is possible to suppress IR drops in the power supply voltage within the LSI and reduce operating power by preventing the skew of internal signals from increasing and suppressing DC through currents.

The peak current can also be reduced by avoiding clock overlap.

The peak-current reducing effects eliminate the need to require an excessive allowable current capability for external components (power supply ICs), and also make it possible to reduce the component cost of power supply ICs.

An example has been described in this embodiment where asymmetric multiprocessor 100 is provided with hardware resource mediation section 110, signal processing content selection section 111, clock skew mediation section 112 and clock delay generation sections 113a through 113g, but anyone of the above may be provided alone.

In this embodiment, clock skew mediation section 112 delays the clock signal for which clock skew selection enable signal 114 is outputted to clock delay generation sections 113a through 113g, but the clock signal may be delayed by any method providing that control is performed to arbitrarily shift the clock phase relationship among groups.

Embodiment 2

Embodiment 1 is configured so that the CPUs make slave connections with the hardware accelerators and share the hardware accelerators for the purpose of increasing the CPU processing speed. When the hardware resources requested by the CPUs conflict, the processing of one of the CPUs have to be stalled, and in this case, the processing performance decreases. To prevent this situation from occurring, a configuration is adopted where the CPUs also share dynamically reconfigurable signal processor section 107 which can be dynamically reconfigured and connected as a slave.

In Embodiment 2, an architecture that is capable of further increasing the degree of freedom by connecting a DSP as a slave of a CPU will be described.

Figure 5:
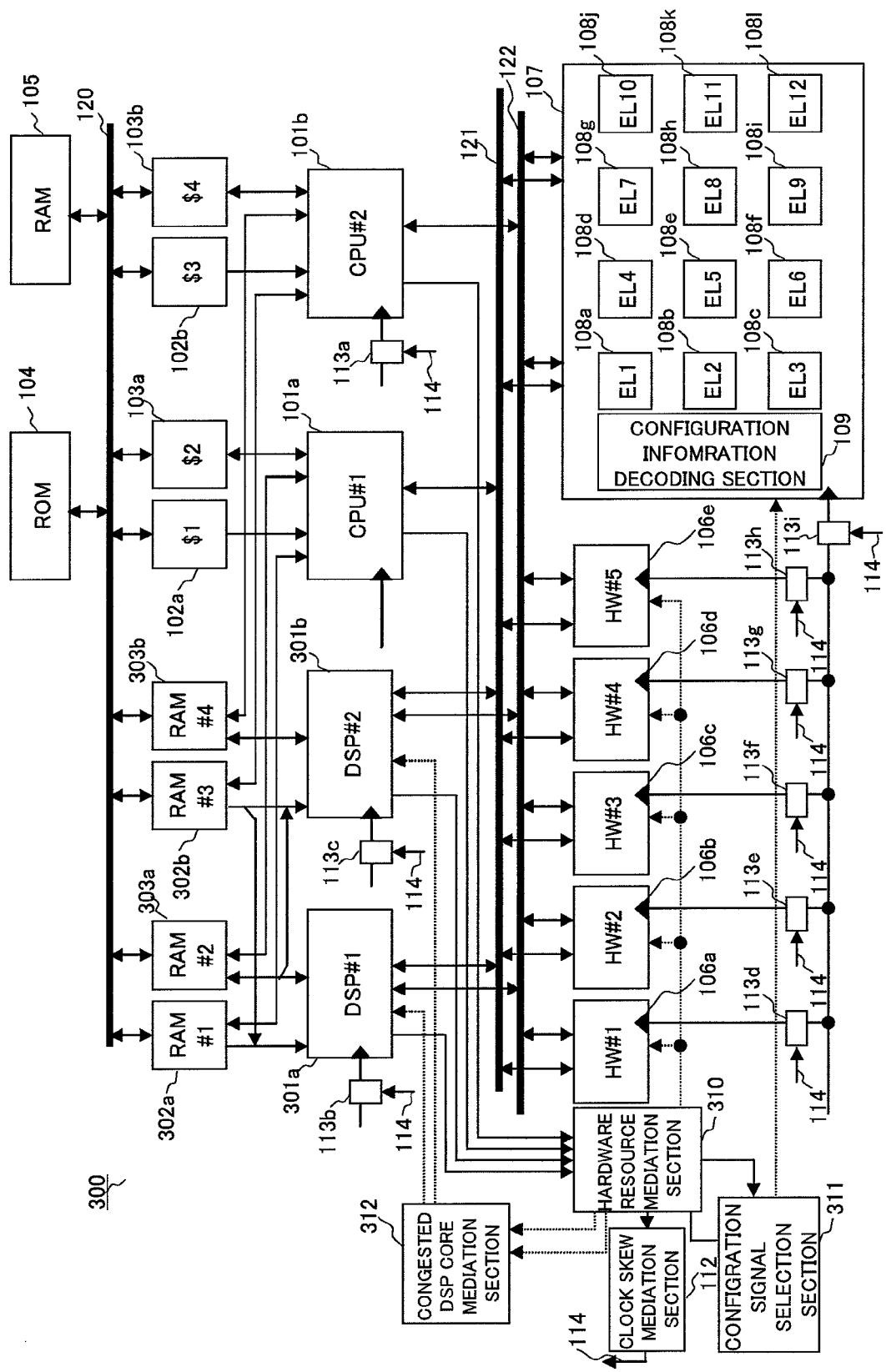
FIG. 5 is a block diagram showing a configuration of the asymmetric multiprocessor according to Embodiment 2 of the present invention.

FIG. 5 is a block diagram showing the configuration of the asymmetric multiprocessor according to Embodiment 2 of the present invention.

Components that are the same as those in FIG. 2 will be assigned the same reference numerals for the description of this embodiment without further explanations.

In FIG. 5, asymmetric multiprocessor 300 is configured with: first CPU core 101a (CPU #1); second CPU core 101b (CPU #2); first DSP core 301a (DSP #1); second DSP core 301b (DSP #2); first command cache 102a ($1); first data cache 103a ($2); second command cache 102b ($3); second data cache 103b ($4); first command RAM 302a (RAM #1); first data RAM 303a (RAM #2); second command RAM 302b (RAM #3); second data RAM 303b (RAM #4); ROM 104; RAM 105; a plurality of hardware accelerator sections 106a through 106e (HW #1 through #5); dynamically reconfigurable signal processor section 107 which can be dynamically reconfigured; hardware resource mediation section 310 for mediating a request signal issued by CPU cores 101a and 101b that requests permission to use an arbitrary DSP; configuration signal selection section 311 that mediates a request signal for permission to use a processor capable of dynamic reconfiguration from the processor cores (CPU cores), and issues configuration information that corresponds to the signal processing requested by the CPU to the dynamically reconfigurable processor; congested DSP core mediation section 312 that mediates when a single processor core selects a plurality of congested DSP cores; clock skew mediation section 112 that performs control to arbitrarily shift the clock phase relationship among groups; and clock delay generation sections 113a through 113i that delay the clock signal based on clock skew selection enable signal 114.

Hardware resource mediation section 310 mediates request signals issued by the CPUs for permission to use arbitrary DSPs.

This mediation of request signals enables an arbitrary processor core (CPU core) to execute the signal processing program of an arbitrary DSP. Hardware resource mediation section 310 also mediates a request signal from CPU cores 101a and 101b that requests permission to use an arbitrary hardware accelerator, in the same way as hardware resource mediation section 110 shown in FIG. 2. When one processor core (CPU core) selects a plurality of congested DSPs, and a signal relatively corresponding to the starting address of a program is issued to one DSP core, congested DSP core mediation section 312 performs control so that the other DSP core also simultaneously performs parallel processing.

The operation of asymmetric multiprocessor 300 configured as described above will next be described.

The basic operation of hardware resource mediation section 310 and clock skew mediation section 112 is the same as in asymmetric multiprocessor 100 of Embodiment 1. Features of this embodiment includes that hardware resource mediation section 310 also issues a command to configuration signal selection section 311 and congested DSP core mediation section 312, and that configuration signal selection section 311 and congested DSP core mediation section 312 perform the following operation.

When a command of requesting DSP processing is transmitted from a CPU to hardware resource mediation section 310, congested DSP core mediation section 312 connects one of the DSP cores to the bus and starts DSP program processing. For example, when interleave processing is to be performed by first DSP core 301a (hereinafter referred to as DSP #1), first CPU core 101a (hereinafter referred to as CPU #1) issues a command for starting DSP #1 to hardware resource mediation section 310, and hardware resource mediation section 310 determines that a DSP, rather than a hardware accelerator, and relays the command to congested DSP core mediation section 312. The DSP is started and the desired signal processing is performed. The command issued at this time is information that corresponds to an interleave program starting address in first command RAM 302a (RAM #1). Accordingly, when a plurality of programs are downloaded to the DSP, a program can be selected from the plurality of programs and executed.

First command RAM 302a and second command RAM 302b of DSP #1 and second DSP core 301b (hereinafter referred to as DSP #2) are continuous address spaces, and a program provided in DSP #2 can be executed by issuing the information corresponding to the command memory space of DSP #2 as a command.

In this case, the command for the CPU to execute the DSP program is taken as relative address information, and thereby it is possible to reduce the number of signal lines for communication between the CPU and DSP, and the bit width of the command memory is not necessarily needed.

Hardware resource mediation section 310 relays the command to congested DSP core mediation section 312 as described above, and also relays information indicating the selected DSP to clock skew mediation section 112. When the request signal is from CPU #1, the skew is controlled so as to be 0 ns with respect to the CPU clock. When a DSP is started by the request from CPU #2, clock skew mediation section 112 transmits a control signal (clock skew selection enable signal 114) to clock delay generation sections 113a and 113b, so that the skew of the clock of CPU #2 and the clock of the selected DSP #1 is shifted by one-half cycle, for example, with respect to the clock of CPU #1. By this means, there is no overlap of clock edges between CPU #1 and CPU #2 or DSP #2, and therefore, even when there is congestion, a drop in the power supply voltage within the LSI can be suppressed, and peak-current reducing effects are obtained. When a high-performance processor having a high operating frequency is provided, the processor has a high operating power, and therefore a power supply IC having an extremely high current supply capability is required. The peak-current reducing effects of this embodiment eliminate the need to require an excessive allowable current capability for external components (power supply ICs), and also make it possible to reduce the component cost of power supply ICs.

At the same time that CPU #1 uses any one of DSP #1 and DSP #2, CPU #2 can select any one (the DSP not selected by CPU #1) of DSP #2 and DSP #1 and can perform simultaneous execution (congestion).

In signal processing where both the computing load and the degree of parallelism are high, it is also possible for any one of CPU #1 and CPU #2 to make slave connections with DSP #1 and DSP #2 as a dual DSP core, divide the DSP program for parallel processing, and perform signal processing having a higher processing power (MIPS: Million Instructions Per Second). At this time, CPU #1, for example, issues a command that includes information corresponding to a program starting address downloaded to the command memory (first command RAM 302a) of DSP #1, and bit information indicating a dual mode. The program of first command RAM 302a issues (fetches) a command to both DSP #1 and DSP #2, and therefore there is no need to redundantly download the program to the command memory (second command RAM 302b) of DSP #2.

As described in detail above, asymmetric multiprocessor 300 of this embodiment is configured with: hardware resource mediation section 310 that mediates a request signal issued by CPU cores 101a and 101b that requests permission to use an arbitrary DSP; configuration signal selection section 311 that issues configuration information that corresponds to the signal processing requested by the CPU to dynamically reconfigurable signal processor section 107; and congested DSP core mediation section 312 that performs relative control so that when a signal corresponding to the starting address of a program is issued to one DSP core, the other DSP core can also simultaneously perform parallel processing. Therefore, in addition to the same effects obtained in Embodiment 1, an arbitrary processor core can execute the signal processing program of an arbitrary DSP, and the degree of freedom of processor load distribution can be enhanced for a plurality of DSPs connected to buses 121 and 122. Control can also be performed so that, when one processor core selects a plurality of congested DSPs, the other DSP core can also perform parallel processing simultaneously.

In this embodiment, as a method for avoiding hardware resource conflicts, configuration signal selection section 311 is configured so that dynamically reconfigurable signal processor section 107 which can be dynamically reconfigured can be connected via buses 121 and 122, and dynamically reconfigurable signal processor section 107 can be reconfigured and used so as to allow the desired signal processing to be performed when a request signal for a resource of a hardware accelerator prepared in order for an arbitrary CPU to execute highly efficient signal processing is received from a plurality of CPUs at once, or when a request signal is subsequently received from another CPU while one CPU is in use. The internal hardware resources and the surface area of circuits can thereby be reduced.

In this embodiment, the configuration example has been described where asymmetric multiprocessor 300 is provided with hardware resource mediation section 310, congested DSP core mediation section 312, clock skew mediation section 112 and configuration signal selection section 311, but anyone of configuration signal selection section 311 and congested DSP core mediation section 312 may also be provided alone.

It is also possible to omit clock skew mediation section 112.

Embodiment 3

In Embodiment 2, hardware resource mediation section 310, clock skew mediation section 112, configuration signal selection section 311 and congested DSP core mediation section 312 are provided, and a detailed description has been given of a method whereby these components share a hardware accelerator, a DSP or a dynamically reconfigurable processor.

Each of the above-described components may also be used alone.

Embodiment 3 provides a technical element capable of executing signal processing with high efficiency when one or a plurality of DSP cores is provided in addition to the first CPU, the second CPU and a hardware accelerator. In Embodiment 3, the components can be used singly or in combination as parts of asymmetric multiprocessor 300 of Embodiment 2.

The hardware configuration of the asymmetric multiprocessor according to Embodiment 3 is the same as in FIG. 5, and no description thereof is given.

Embodiment 3 can be divided into a "signal processing function" for enhancing the signal processing performance of the CPUs, and a "control function for varying the operating frequency or operating power supply voltage" in order to lower the operating power of each CPU, DSP, dynamically reconfigurable processor, or other component.

(Signal Processing Function)

(1) When a plurality of DSPs are provided in the asymmetric multiprocessor according to Embodiment 3, a multiprocessing configuration is employed where a single CPU connects to a plurality of DSPs as slaves, and the plurality of DSPs perform parallel signal processing of a single task using an interrupt signal from the CPU as a trigger. As shown in FIG. 5, the asymmetric multiprocessor according to this embodiment has first DSP core 301a (DSP #1) and second DSP core 301b (DSP #2); and first CPU core 101a (CPU #1) or second CPU core 101b (CPU #2) makes a slave connection with DSP #1 and DSP #2 via buses 121 and 122. In hardware resource mediation section 310, an interrupt signal from a single CPU (for example, CPU #1) is used as a trigger to allow parallel signal processing of a single task to be carried out using DSP #1 and DSP #2.

(2) In (1) described above, in particular, hardware resource mediation section 310 performs control so that a corresponding DSP program is started when information corresponding to a leading address of each signal processing in the program stored in a DSP is inputted to hardware resource mediation section 310 from the CPU. Hardware resource mediation section 310 also receives the ON of a control bit or a control signal that indicates the execution of multi-DSP processing, and parallel signal processing is performed by transmitting a command fetched from the command memory of the first DSP to a plurality of DSP cores such as the first DSP core and the second DSP core.

(3) The asymmetric multiprocessor according to Embodiment 3 has a plurality of DSP cores, and each DSP core is also capable of fetching commands from the command memory of another DSP core. Hardware resource mediation section 310 performs control so that, when one CPU specifies a starting address of the command memory in a first DSP in a case where the processor core (CPU core) selects a plurality of DSP cores and performs parallel operation, the command of the address is fetched simultaneously to the plurality of DSP cores, and the DSP cores perform multiprocessing.

(4) The asymmetric multiprocessor according to Embodiment 3 has a function for executing a plurality of DSP cores by a fetch from the same command RAM. In the parallel processing mode of the DSPs, it is preferable that addressing of the second and subsequent DSP cores relatively correct the first DSP.

(Control Function for Varying the Operating Frequency or the Operating Power Supply Voltage)

(5) In the asymmetric multiprocessor according to Embodiment 3, an arbitrary phase difference is applied to a phase of a clock signal supplied to the second CPU core and a hardware accelerator, a DSP, or a reconfigurable processor which is connected as a slave to the second CPU core, or is applied to a phase of a clock signal supplied to the third or a subsequent CPU, and a signal processing circuit resource that is connected as a slave to the third or subsequent CPU. The phase difference is applied with respect to a phase of a clock signal supplied to the first processor core and a hardware accelerator, a DSP, or a reconfigurable processor which is connected as a slave to the first processor core when a first processor core (CPU core) performs signal processing simultaneously with a second processor core (CPU core) or a third or subsequent processor. For example, when first CPU core 101a (CPU #1) and second CPU core 101b (CPU #2) simultaneously process a signal, an arbitrary phase difference is applied between the phase of the clock signal supplied to CPU #1 and a hardware accelerator, a DSP, or dynamically reconfigurable signal processor section 107 connected thereto as a slave, and the phase of the clock signal supplied to CPU #2 and a hardware accelerator, a DSP, or dynamically reconfigurable signal processor section 107 connected thereto. By this means, when CPU #1 and CPU #2 perform signal processing simultaneously, the phases of the clock signals that are supplied to the CPUs and a hardware accelerator, a DSP, or dynamically reconfigurable signal processor section 107 connected to the CPUs as slaves are shifted, and thereby it is possible to suppress a decrease in the peak.

(6) The asymmetric multiprocessor according to Embodiment 3 preferably has a power management mode for performing multiprocessing where the amount of signal processing is divided among a plurality of processor cores, DSP cores or hardware accelerators to perform multiprocessing, and the power supply voltage, the clock frequency or the substrate bias voltage are changed to a lower power supply voltage, a lower clock frequency or a base potential where a threshold increases in a pseudo manner compared to the signal processing by a single processor.

By this power management mode, it is possible to lower power consumption and achieve low power consumption compared to signal processing by a single processor.

(7) The asymmetric multiprocessor according to Embodiment 3 may also be provided with a function of capable of changing the clock frequency or the power supply voltage according to the signal processing amount. This signal processing amount also includes change in the clock frequency or the power supply voltage when signal processing is not performed. For example, while signal processing is performed by a first CPU core and a hardware accelerator, DSP or reconfigurable processor connected as slaves to the first CPU core, when there is no need for signal processing to be performed by a second CPU core and hardware accelerator, DSP or reconfigurable processor connected as slaves to the second CPU core, a function (retention function) is executed that turns off a power supply voltage to the second CPU core and the hardware accelerator, DSP or reconfigurable processor connected as slaves to the second CPU core, or reduces the power supply voltage to a minimum voltage at which data can be stored and held in a memory or a register.

As described in detail above, according to this embodiment, when one or a plurality of DSP cores is provided in addition to the first CPU, the second CPU and a hardware accelerator, signals can be processed with high efficiency by the CPU using DSP software for signal processing. When the above-described hardware accelerator is started, the CPU can execute the corresponding DSP program by adding an address relatively indicating the command memory of the DSP in the same space as the selected register map, and issuing a request signal. In this arrangement, an arbitrary DSP can be selected from DSPs provided with two or more CPUs of either one of two or more CPUs, a function for performing parallel processing on the plurality of DSPs as a multi-core is provided, and it is possible to provide high processing performance with low power by using the function in combination with a function of varying the operating frequency or operating voltage of the DSPs. The command memory of DSP #1 and the command memory of DSP #2 each store their programs, but, when the DSPs operate as a multi-core processing DSP, by storing a program in either one of the command memory, a configuration is adopted where commands are fetched (issued) for both DSP cores, and two or more DSPs operate simultaneously, and a mechanism is provided where one of the DSP programs is relatively used for translation to another DSP program so that inconsistency of address calculation (addressing) does not occur.

When signal processing performance is to be enhanced by connecting one or a plurality of DSP cores as slaves to any one of the asymmetric multi-CPU-core processors, optimum load distribution is made possible by enabling an arbitrary CPU to activate an arbitrary DSP, and a single CPU core can use a plurality of DSP cores to perform parallel processing when the signal processing is redundant and highly parallel.

In this case, it is possible to achieve further low power consumption by using the function in combination with a function of varying the operating frequency or operating voltage of the DSPs.

Furthermore, when the multi-DSP-core processing of the present invention is implemented, commands are issued by any one of DSP command RAMs in the command memory, so that it is possible to efficiently utilize the command RAM space, and in addition, the hardware resources of the command memory can be further reduced, so that it is possible to reduce the surface area.

Embodiment 4

Embodiments 1 through 3 have described the method for sharing a hardware accelerator, DSP or dynamically reconfigurable processor, and also described accompanying methods for reducing power consumption by varying the operating frequency or operating power supply voltage of the CPUs, DSP, dynamically reconfigurable processors or other components for each configuration variation of the asymmetric multiprocessor.

Further, a method for adjusting the clock phase between multiprocessors in the variations and reduction of the peak current and IR drops by this method have been described.

Embodiment 4 is an example of an application that has the same configuration as the above-described Embodiments 1 through 3, and two additional memory usage modes.

Figure 6:
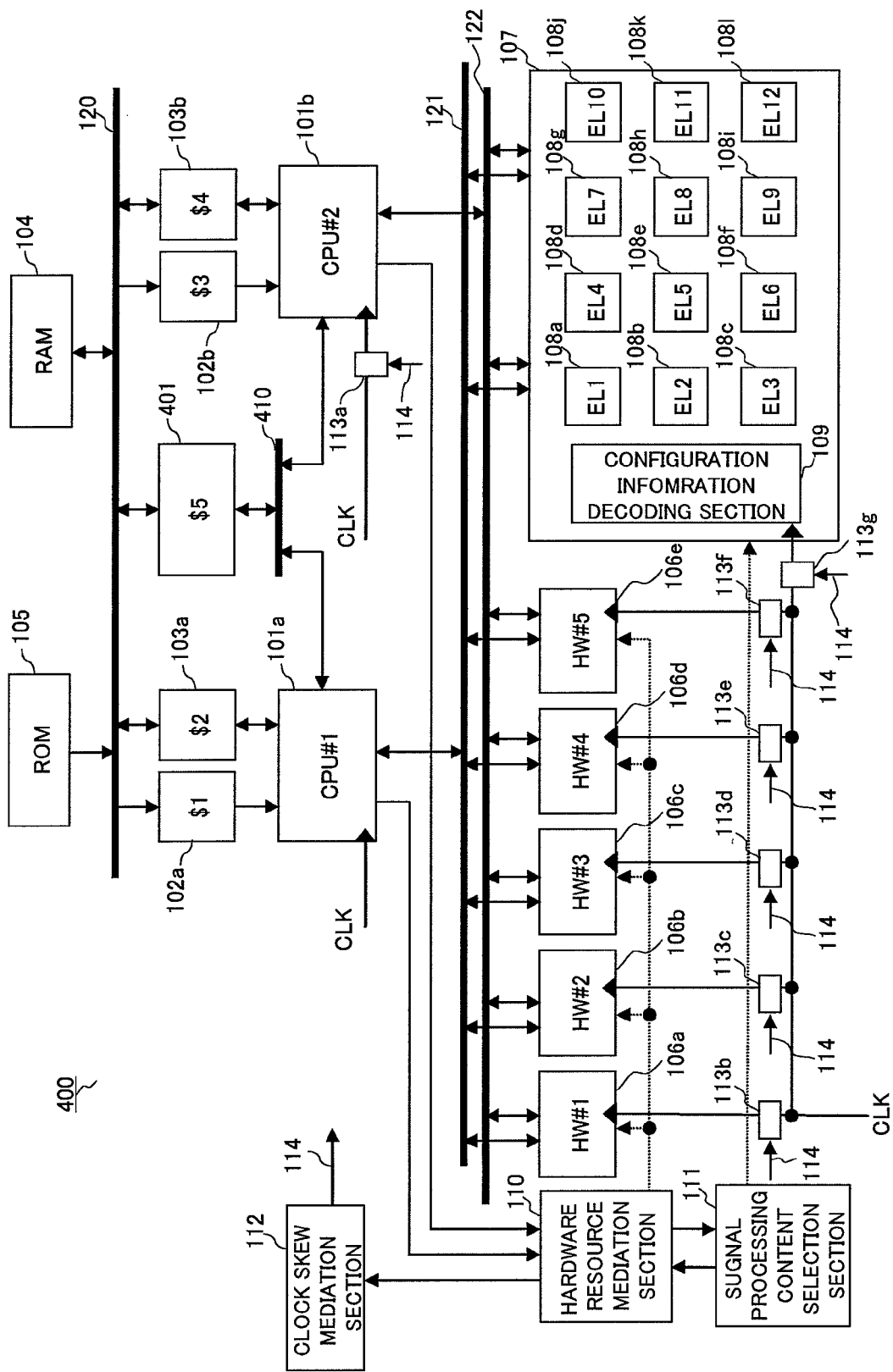
FIG. 6 is a block diagram showing a configuration of the asymmetric multiprocessor according to Embodiment 4 of the present invention.

FIG. 6 is a block diagram showing the configuration of the asymmetric multiprocessor according to Embodiment 4 of the present invention. Components that are the same as those in FIG. 2 will be assigned the same reference numerals for the description of this embodiment without further explanations.

In FIG. 6, asymmetric multiprocessor 400 is configured with: first CPU core 101a (CPU #1); second CPU core 101b (CPU #2); first command cache 102a ($1); first data cache 103a ($2); second command cache 102b ($3) ; second data cache 103b ($4) ; shared memory 401 ($5) that stores highly common commands or data when a plurality of CPUs operate as a multiprocessor; ROM 104; RAM 105; a plurality of hardware accelerator sections 106a through 106e (HW #1 through #5); dynamically reconfigurable signal processor section 107 which can be dynamically reconfigured; hardware resource mediation section 110 for mediating a request signal issued by CPU cores 101a and 101b that requests permission to use an arbitrary hardware accelerator; signal processing content selection section 111 that selects signal processing content of dynamically reconfigurable signal processor section 107 connected as a slave; clock skew mediation section 112 that performs control for arbitrarily shifting a clock phase relationship among groups; and clock delay generation sections 113a through 113g that delay the clock signal based on clock skew selection enable signal 114.

Shared memory 401 can be accessed by a plurality of processors simultaneously, and serves to share data among the plurality of processors.

First CPU core 101a (CPU #1) is connected to ROM 104 and RAM 105 via first command cache 102a ($1), first data cache 103a ($2) and bus 120; and second CPU core 101b (CPU #2) is connected to ROM 104 and RAM 105 via second command cache 102b ($3), second data cache 103b ($4) and bus 120.

First CPU core 101a (CPU #1) and second CPU core 101b (CPU #2) are connected to shared memory 401 ($5) via bus 410, and shared memory 401 ($5) is connected to ROM 104 and RAM 105 via bus 120.

First CPU core 101a (CPU #1) is connected via bus 121 to hardware accelerator sections 106a through 106e (HW #1 through #5) and dynamically reconfigurable signal processor section 107; and second CPU core 101b (CPU #2) is connected via bus 122 to hardware accelerator sections 106a through 106e (HW #1 through #5) and dynamically reconfigurable signal processor section 107.

The operation of asymmetric multiprocessor 400 configured as described above will be described hereinafter.

There are generally cases where all the plurality of CPUs provided in the asymmetric multiprocessor operate in the same way, but the plurality of CPUs do not always perform parallel operation with the same processing load. For example, one of the CPU processing is temporarily placed in a wait state, unlike in the multiprocessor, and there are many components where the operating frequency or operating speed is asymmetric. Therefore, asymmetric multiprocessor 400 has shared memory 401 that stores highly common commands or data when a plurality of CPUs operate as a multiprocessor, and commands or data that have high uniqueness for each CPU are stored in a cache of each CPU.

Asymmetric multiprocessor 400 can also alternately access to shared memory 401 and the cache memory of the CPUs. When a cache mishit occurs, the CPU switches to accessing to shared memory 401 while the cache is being refilled, and a wait operation is prevented from occurring in the CPU core insofar as possible.

When a miss-hit occurs in accessing to shared memory 401, memory access is switched back to the cache, and shared memory 401 is refilled in the background. In this way, an operation mode for reducing the idle time during the refill operation through alternate access, and a shared memory mode for sharing a highly common program between multiple cores are separately used.

Shared memory 401 is used according to the following two memory usage modes: "shared memory mode" and "alternate memory mode."

In the first memory mode ("shared memory mode"), when first CPU core 101a (hereinafter referred to as CPU #1) and second CPU core 101b (hereinafter referred to as CPU #2) operate as a multiprocessor, the CPUs has shared memory 401 for storing shared data or commands besides the command caches (command caches 102a and 102b) that fetch normal commands or the data caches (data caches 103a and 103b) that are working areas during normal operation. When the first memory mode is a multiprocessor mode and a "shared memory mode," the efficiency of memory space can be increased, and the surface area of the package can be reduced by storing a highly common program in shared memory 401.

The second memory mode ("alternate memory mode"), for example, enables any one of the plurality of CPUs to utilize shared memory 401. CPU #1, for example, is enabled to use first command cache 102a and shared memory 401 as command memory.

In this command mode, CPU #1 fetches a command from the command cache (first command cache 102a), but, when a cache mishit occurs, the command cache (first command cache 102a) is refilled from ROM 104. During this operation, the core of CPU #1 in the conventional multiprocessor is placed in a wait state, and CPU #1 (first command cache 102a) in the second memory mode ("alternate memory mode") of this embodiment is switched so as to fetch a command from shared memory 401 during the operation for refilling the command memory (first command cache 102a) when a mishit occurs.

When there is subsequently a mishit in fetching from shared memory 401, the operation for refilling the shared memory 401 is performed thereafter, and CPU #1 is switched so that another fetch is made from the command cache (first command cache 102a).

A switch is made to shared memory 401 and a fetch is made during refilling when a mishit occurs in the command cache (first command cache 102a), but CPU #1 immediately enters a wait state when a mishit occurs in shared memory 401 while refilling of the command cache (first command cache 102a) is not yet completed. When the refill operation in the command cache is completed to a degree equal to or greater than a predetermined value, for example, new commands have been replaced (refilled) into 50% or more of the cache space, control is performed so that a switch is made to the command cache (first command cache 102a) from shared memory 401, CPU #1 then begins the fetch operation, and shared memory 401 is refilled in the background.

In the conventional multiprocessor, the CPU waits when a cache mishit occurs, but the processing performance of the CPU can be enhanced in this embodiment by utilizing shared memory 401 to provide a mode for alternately performing fetch operations from shared memory 401 and the command cache. By storing programs that are highly common between cores (for example, basic software and OS components) in shared memory 401 of the multi-core processor, it is possible to achieve reduction of circuit scale area as a multiprocessor. Further, by providing such a control mode that enables the two characteristics described above to be used appropriately, it is possible to achieve circuit surface area reduction, CPU processing performance enhancement and power consumption reduction.

Command memory has been used in the example described above, but the example applies in the same way to data memory.

The case has been also described where only a single CPU uses the shared memory in the second memory mode ("alternate mode"), but a configuration may also be adopted where the memory space of the shared memory is divided so that a plurality of CPU cores performs the second memory mode ("alternate mode").

As described in detail above, according to this embodiment, asymmetric multiprocessor 400 is provided with shared memory 401 for storing highly common commands or data when a plurality of CPUs operate as a multiprocessor, and commands or data that are highly specific to each CPU are stored in command caches 102a ($1), 103a ($2), 102b ($3) and 103b ($4) of the CPUs. There are also cases where all the plurality of CPUs provided in asymmetric multiprocessor 400 operate in the same way, but the plurality of CPUs do not always perform the parallel operation with the same processing load. For example, one of the CPUs is temporarily placed in a wait state, unlike in the symmetric multiprocessor, and there are many components where the operating frequency or operating speed is asymmetric. Therefore, a configuration is adopted where shared memory 401 and the cache memory of the CPU are alternately accessed. When a cache mishit occurs, the CPU switches to accessing to shared memory 401 while the cache is being refilled, and a wait operation is prevented from occurring in the CPU core insofar as possible.

When a mishit occurs in accessing to shared memory 401, memory access is switched back to the cache, and shared memory 401 is refilled in the background. A configuration is thus adopted where two modes of an operation mode for reducing the idle time during the refill operation through alternate access, and a shared memory mode for sharing a highly common program between multiple cores can be separately used. By providing a shared memory region for storing programs such as basic software (OS) that are highly common in multi-core processing, the effect of reducing the circuit surface area can be obtained.

This embodiment has a mode for making a switch and using a shared memory region as a part of the primary cache of a CPU.

By this means, CPU idle time does not occur even when the refill operation occurs upon a mishit in the CPU cache. Therefore, the effect of enhancing the CPU processing performance can be obtained.

The description given above is an illustration of preferred embodiments of the present invention, and does not limit the scope of the present invention.

The term "asymmetric multiprocessor" has been used for convenience in these embodiments, but it is apparent that "multiprocessor system" or another term may also be used.

Furthermore, the embodiments do not limit the type, number, method of connection, and the like of the processor cores, DSP cores, hardware accelerators, and dynamically reconfigurable processors that configure the above-described asymmetric multiprocessor, or the configuration examples and the like of the hardware resource mediation section, the clock skew mediation section and selection sections.

According to the present invention as described above, each CPU of the asymmetric processor is capable of freely selecting an appropriate hardware accelerator and making a slave connection to the hardware accelerator, so that the degree of freedom of distributed processing can be increased, and the processing load on each processor (CPU) can be minimized.

By this means, it is possible to reduce the operating frequency or lower the power supply voltage more effectively, and achieve larger reduction in power consumption.

When one or a plurality of DSP cores is connected for signal processing as slaves to any one of the asymmetric multi-CPU-core processors to enhance signal processing performance, optimum load distribution can be obtained by enabling an arbitrary CPU to activate an arbitrary DSP. Furthermore, a single CPU core can perform parallel processing of a plurality of DSP cores when the signal processing is redundant and highly parallel, and, by using the function in combination with a function of varying the operating frequency or operating voltage of the DSPs, it is possible to achieve further reduction in power consumption.

Furthermore, when the multi-DSP-core processing of the present invention is implemented, commands are issued by any one of DSP command RAM in the command memory, so that it is possible to efficiently use the command RAM space, and the hardware resources of the command memory can be further reduced, so that it is possible to reduce the surface area.

Further, it is possible to suppress an IR drop of the power supply voltage within the LSI and achieve reduction in the operating power by preventing the skew of internal signals from increasing and suppressing DC through currents. The peak current can also be reduced by avoiding clock overlap. The peak-current reducing effects eliminate the need to require an excessive allowable current capability for external components (power supply ICs), and also make it possible to reduce the component cost of power supply ICs.

The internal hardware resources and the surface area of circuits can also be reduced.

Furthermore, by providing a shared memory region for storing programs such as basic software (OS) that are highly common in multi-core processing, the effect of reducing the circuit surface area can be obtained. The shared memory region is switched and used as a part of the primary cache of a CPU, and therefore a CPU idle time does not occur even when the refill operation occurs upon a mishit in the CPU cache, and the effect of enhancing the CPU processing performance can be obtained.

Accordingly, the asymmetric multiprocessor according to the present invention has a configuration for sharing a hardware accelerator among the CPUs, a configuration for adjusting the clock phases of the CPUs, and a mechanism for distributing processing by dividing the amount of work of the processors into tasks and allocating the tasks. The asymmetric multiprocessor of the present invention is useful for lowering the power or reducing the surface area of a system LSI where media processors or base band processors are integrated. The system LSI configured using the asymmetric multiprocessor of the present invention can be particularly applied to mobile telephones, portable game devices, portable electronic notebooks, portable video cameras, and other devices where "digital TV," "digital video," "audio reproduction," "Internet communication," "video telephony," "wireless LAN," "games requiring high-performance graphics processing," and other functions can be performed by a single electronic device.

What is claimed is:

1. An asymmetric multiprocessor, comprising:
   a plurality of processor cores;
   a plurality of hardware accelerators;
   a bus that interfaces said plurality of processor cores with said plurality of hardware accelerators;
   a hardware resource mediator that mediates a request signal from a processor core, of said plurality of processor cores, that requests permission to use a hardware accelerator, of said plurality of hardware accelerators; and
   a plurality of DSP cores and a dynamically reconfigurable processor,
   wherein said processor core subjected to mediation of the request signal by said hardware resource mediator uses said hardware accelerator; and
   when a second processor core, of said plurality of processor cores, and said hardware accelerator, a DSP core, of said plurality of DSP cores, and said dynamically reconfigurable processor connected as a slave to said second processor core do not have to perform signal processing while a first processor core, of said plurality of processor cores, and said hardware accelerator, said DSP core and said dynamically reconfigurable processor connected as a slave to the first processor core do perform signal processing, said second processor core and said hardware accelerator, said DSP core and said dynamically reconfigurable processor connected as a slave to said second processor core turn OFF a power supply voltage or execute a retention function to reduce the power supply voltage to a minimum voltage at which data can be stored and held in a memory or a register.

2. The asymmetric multiprocessor according to claim 1, further comprising a clock skew mediator that performs control so as to shift a clock phase relationship among groups of a first signal processing group configured with a first processor core and said hardware accelerator that requests execution of signal processing from said first processor core, and a second signal processing group configured with a second processor core and said hardware accelerator that requests execution of signal processing from said second processor core.

3. The asymmetric multiprocessor according to claim 2, wherein clock inputters of the groups further comprise clock delay generators that shift a clock phase among said groups by delaying a supplied clock signal.

4. The asymmetric multiprocessor according to claim 1, further comprising a plurality of DSP cores, wherein:
   said plurality of processor cores are connected to said plurality of DSP cores via said bus,
   said hardware resource mediator mediates a DSP usage permission request signal issued by said processor core, and
   said processor core that is subjected to mediation of said DSP usage permission request signal by said hardware resource mediator makes a DSP core, of said plurality of DSP cores, execute a signal processing program.

5. The asymmetric multiprocessor according to claim 1, further comprising a plurality of DSP cores, wherein said processor core connects to said plurality of DSP cores as slaves, and said plurality of DSP cores perform parallel signal processing of a single task using an interrupt signal from said processor core as a trigger.

6. The asymmetric multiprocessor according to claim 1, further comprising a plurality of DSP cores, wherein said hardware resource mediator performs control so that, when information that corresponds to a leading address of each signal processing in a program stored in a DSP core of said plurality of DSP cores is inputted from said processor core, a corresponding DSP program is started.

7. The asymmetric multiprocessor according to claim 1, further comprising a plurality of DSP cores,
   wherein said hardware resource mediator that receives an ON control signal or a control bit indicating execution of multi DSP processing, and that transmits commands fetched from a first DSP core command memory to said plurality of DSP cores that include said first DSP core and a second DSP core, and said plurality of DSP cores to which the commands are transmitted, execute parallel signal processing.

8. The asymmetric multiprocessor according to claim 1, further comprising a plurality of DSP cores, wherein:
a DSP core, of said plurality of DSP cores, is capable of fetching commands from a command memory of other DSP cores, of said plurality of DSP cores,
said hardware resource mediator performs control so that, when said processor core selects said plurality of DSP cores and makes said plurality of DSP cores perform a parallel operation, and said processor core specifies a starting address of a command memory in a first DSP core, a command of the starting address from said first DSP core is fetched by said plurality of DSP cores, and said plurality of DSP cores perform multiprocessing.

9. The asymmetric multiprocessor according to claim 1, further comprising a plurality of DSP cores, wherein, when signal processing is executed by said plurality of DSP cores that fetch from a same command RAM, said hardware resource mediator performs a relative correction using addressing of a second DSP core and subsequent DSP core on said first DSP core in a DSP parallel processing mode.

10. The asymmetric multiprocessor according to claim 1, further comprising a plurality of DSP cores and a congested DSP core mediator that performs a control so that, when said processor core selects said congested DSP core, and a signal corresponding to a starting address of a program is relatively issued to one DSP core of said plurality of DSP cores, other DSP cores of said plurality of DSP cores also perform parallel processing.

11. The asymmetric multiprocessor according to claim 1, further comprising a dynamically reconfigurable processor, wherein:
a first processor core, and a second processor core, of said plurality of processor cores, are connected via said bus to said dynamically reconfigurable processor,
a configuration signal selector mediates a usage permission request signal of said dynamically reconfigurable processor from said plurality of processor cores, and issues configuration information that corresponds to a signal processing requested by said at least one of said first and second processor core to said dynamically reconfigurable processor, and
the dynamically reconfigurable processor that receives the configuration information issued by said configuration signal selector executes signal processing requested by said at least one of said first and second processor core.

12. The asymmetric multiprocessor according to claim 1, further comprising a plurality of DSP cores and a dynamically reconfigurable processor, wherein, when a first processor core and a second processor core, of said plurality of processor cores, perform signal processing, a predetermined phase difference is provided to a phase of a clock signal supplied to said second processor core and a hardware accelerator, a DSP core, of said plurality of DSP cores, and said dynamically reconfigurable processor being connected as a slave to said second processor core, and with respect to a phase of a clock signal supplied to said first processor core and said hardware accelerator, said DSP core and said dynamically reconfigurable processor are connected as a slave to said first processor core.

13. The asymmetric multiprocessor according to claim 1, further comprising a plurality of DSP cores, wherein, when said plurality of processor cores, said plurality of DSP cores and said plurality of hardware accelerators perform multiprocessing by dividing a signal processing amount, a power management mode is set that reduces at least one of a power supply voltage, a clock frequency or a substrate bias voltage.

14. The asymmetric multiprocessor according to claim 1, further comprising a shared memory that stores common commands or data, and a cache memory that stores unique commands or data for said processor core, wherein:
when said plurality of processor cores operate as a multiprocessor,
said plurality of processor cores alternately access said shared memory and said cache memory.

15. The asymmetric multiprocessor according to claim 1, wherein said plurality of processor cores comprise a plurality of CPU cores that exhibit different processor performance, such as an operating frequency and an architecture including a command set, a bit width, a memory size, a cache memory size and a number of stages of pipelines.

* * * * *